(12) United States Patent
Raghoebardajal et al.

(10) Patent No.: US 8,274,567 B2
(45) Date of Patent: Sep. 25, 2012

(54) IMAGE PROCESSING METHOD, APPARATUS AND SYSTEM

(75) Inventors: Sharwin Winesh Raghoebardajal, London (GB); Mark Lintott, London (GB)

(73) Assignee: Sony Computer Entertainment Europe Limited (GB)

( * ) Notice: Subject to any disclaimer, the term of this patent is extended or adjusted under 35 U.S.C. 154(b) by 164 days.

(21) Appl. No.: 12/876,456

(22) Filed: Sep. 7, 2010

(65) Prior Publication Data

US 2011/0141301 A1    Jun. 16, 2011

(30) Foreign Application Priority Data

Sep. 7, 2009   (GB) .................................. 0915588.8

(51) Int. Cl.
*H04N 5/225* (2006.01)
*H04N 5/235* (2006.01)
*G06K 9/42* (2006.01)

(52) U.S. Cl. .................. 348/207.1; 348/222.1; 382/259

(58) Field of Classification Search ............. 348/207.11, 348/207.1; 382/258–259
See application file for complete search history.

(56) References Cited

U.S. PATENT DOCUMENTS

| | | | |
|---|---|---|---|
| 4,539,704 A * | 9/1985 | Pastor | 382/258 |
| 2005/0001852 A1 | 1/2005 | Dengler et al. | |
| 2007/0230809 A1* | 10/2007 | Ishida | 382/242 |
| 2008/0214253 A1 | 9/2008 | Gillo et al. | |
| 2009/0066784 A1* | 3/2009 | Stone et al. | 348/47 |
| 2009/0189902 A1 | 7/2009 | Bowkett et al. | |
| 2010/0172595 A1* | 7/2010 | Tsunematsu | 382/258 |

FOREIGN PATENT DOCUMENTS

| | | |
|---|---|---|
| EP | 2 156 869 A1 | 2/2010 |
| JP | 2008021173 A | 1/2008 |

OTHER PUBLICATIONS

XP002616586, Feb. 2007, NZ, Petzold et al.*
ACM vol. 27 No. 3, pp. 236, 1984, Zhang et al.*
European Search Report, EP 10175079, dated Jan. 28, 2011.
Petzold F., Pfeil J., Riechert C., Green R.: "AR Bridge Builder: Real-time Vectorisation of Freehand Sketched Structures for an AR App l i cat ion", Proceedings of Image and Vision Computing, Dec. 2007, pp. 192-197, XP002616586.
Smith R. W.: "Computer Processing of Line Images: A Survey", Pattern Recognition, vol. 20, No. 1, 1978, pp. 7-15, XP002616588.
Ramachandran K.: "Coding Method for Vector Representation of Engineering Drawi ngs", Proceedings of the IEEE, vol. 68, No. 7, Jul. 1980, pp. 813-817, XP002616587.
Search Report from GB Application No. 0915588.8 dated Jan. 8, 2010.

* cited by examiner

*Primary Examiner* — Tuan Ho
*Assistant Examiner* — Shahbaz Nazrul
(74) *Attorney, Agent, or Firm* — Lerner, David, Littenberg, Krumholz & Mentlik, LLP (57) ABSTRACT

An image processing method comprises receiving, from a camera, a camera captured image comprising a user drawn image. At least part of the user drawn image is within a field of view of the camera. The method comprises applying an image processing operation to the camera captured image so as to generate an image feature within the camera captured image which corresponds to the user drawn image, and thinning the image feature to a line width which is smaller than a line width associated with the image feature so as to generate a modified width image feature. The method further comprises generating vector data from pixels associated with the modified width image feature so that the vector data substantially represents the modified width image feature.

12 Claims, 8 Drawing Sheets

IMAGE PROCESSING METHOD, APPARATUS AND SYSTEM

CROSS REFERENCE TO RELATED APPLICATIONS

The present application claims the benefit of and priority to GB Application No. 0915588.8, filed Sep. 7, 2009, the entire disclosure of which is incorporated by reference herein.

BACKGROUND OF THE INVENTION

1. Field of the Invention

The present invention relates to an image processing method, apparatus and system.

2. Description of the Prior Art

Recently, with the advent of ever more powerful computers and video games consoles, computer games are starting to incorporate augmented reality images in which images captured by a camera are combined with computer generated images so as to produce a content-rich media experience for a user.

Additionally, with increasingly powerful image processing techniques, added functionality between a user and an entertainment device may by provided by the use of a camera to capture images of a user. In particular, some systems allow a user to draw a user drawn image on a suitable drawing surface so that the camera can capture an image of the user drawn image. The entertainment device can then carry out image processing on the captured image so that the user drawn image can be included in a game. Other image processing operations can then be applied to the user drawn image so as to provide an enhanced gaming experience for the user.

However, in order to provide this functionality, the entertainment device should be able to generate a digital representation of the user drawn image. One way to achieve this would be to generate bitmap data from the user drawn image which corresponds to the user drawn image. However, it may be difficult to isolate the user drawn image from the background, or from the drawing surface, which may lead to an appearance that the user drawn image has just been "stuck on" to the computer generated image or augmented reality image. Furthermore, if other image operations such as image scaling is carried out on bitmap data, the image quality may be degraded, especially if the user drawn image is enlarged.

The present invention seeks to alleviate or mitigate the above problems.

SUMMARY OF THE INVENTION

In a first aspect, there is provided an image processing method comprising: receiving, from a camera, a camera captured image comprising a user drawn image, at least part of the user drawn image being within a field of view of the camera; applying an image processing operation to the camera captured image so as to generate an image feature within the camera captured image which corresponds to the user drawn image; thinning the image feature to a line width which is smaller than a line width associated with the image feature so as to generate a modified width image feature; and generating vector data from pixels associated with the modified width image feature so that the vector data substantially represents the modified width image feature.

In a second aspect, there is provided an image processing apparatus comprising: receiving means operable to receive, from a camera, a camera captured image comprising a user drawn image, at least part of the user drawn image being within a field of view of the camera; image processing means operable to apply an image processing operation to the camera captured image so as to generate an image feature within the camera captured image which corresponds to the user drawn image; image thinning means operable to thin the image feature to a line width which is smaller than a line width associated with the image feature so as to generate a modified width image feature; and vector data generating means operable to generate vector data from pixels associated with the modified width image feature so that the vector data substantially represents the modified width image feature.

By thinning the image feature generated from the user drawn image, a representation of lines which can be used to reproduce the user drawn image can be obtained. Furthermore, by generating vector data from the modified width image feature, the vector data can be generated such that it substantially represents the modified width image feature. The vector data can then be used to reproduce the main features of the user drawn image within a game.

For example, in an augmented reality game in which a virtual pet is combined with camera captured images so as to interact with a user via a camera, the user could draw an image on a suitable drawing surface. The camera could capture the image drawn by the user and the entertainment device causes the virtual pet to appear to copy the user drawn image. This advantageously improves a gaming experience for a user.

Furthermore, by generating vector data from a thinned image feature, different image processing operations can be applied to the vector data without a degradation in image quality. Additionally, vector data typically has a smaller file size than bitmap data. Therefore, the use of vector data based on a thinned image feature generated from a camera captured image comprising a user drawn image reduces processing and memory resources needed to implement image processing within a game.

Various other respective aspects and features of the invention are described in the appended claims.

BRIEF DESCRIPTION OF THE DRAWINGS

The above and other objects, features and advantages of the invention will be apparent from the following detailed description of illustrative embodiments which is to be read in connection with the accompanying drawings in which.

DESCRIPTION OF THE PREFERRED EMBODIMENTS

An image processing method, apparatus and system are disclosed. In the following description, a number of specific details are presented in order to provide a thorough understanding of embodiments of the present invention. However, it will be apparent to a person skilled in the art that these specific details need not be employed to practise the present invention. Conversely, specific details known to the person skilled in the art are omitted for the purposes of clarity in presenting the embodiments.

Figure 1:
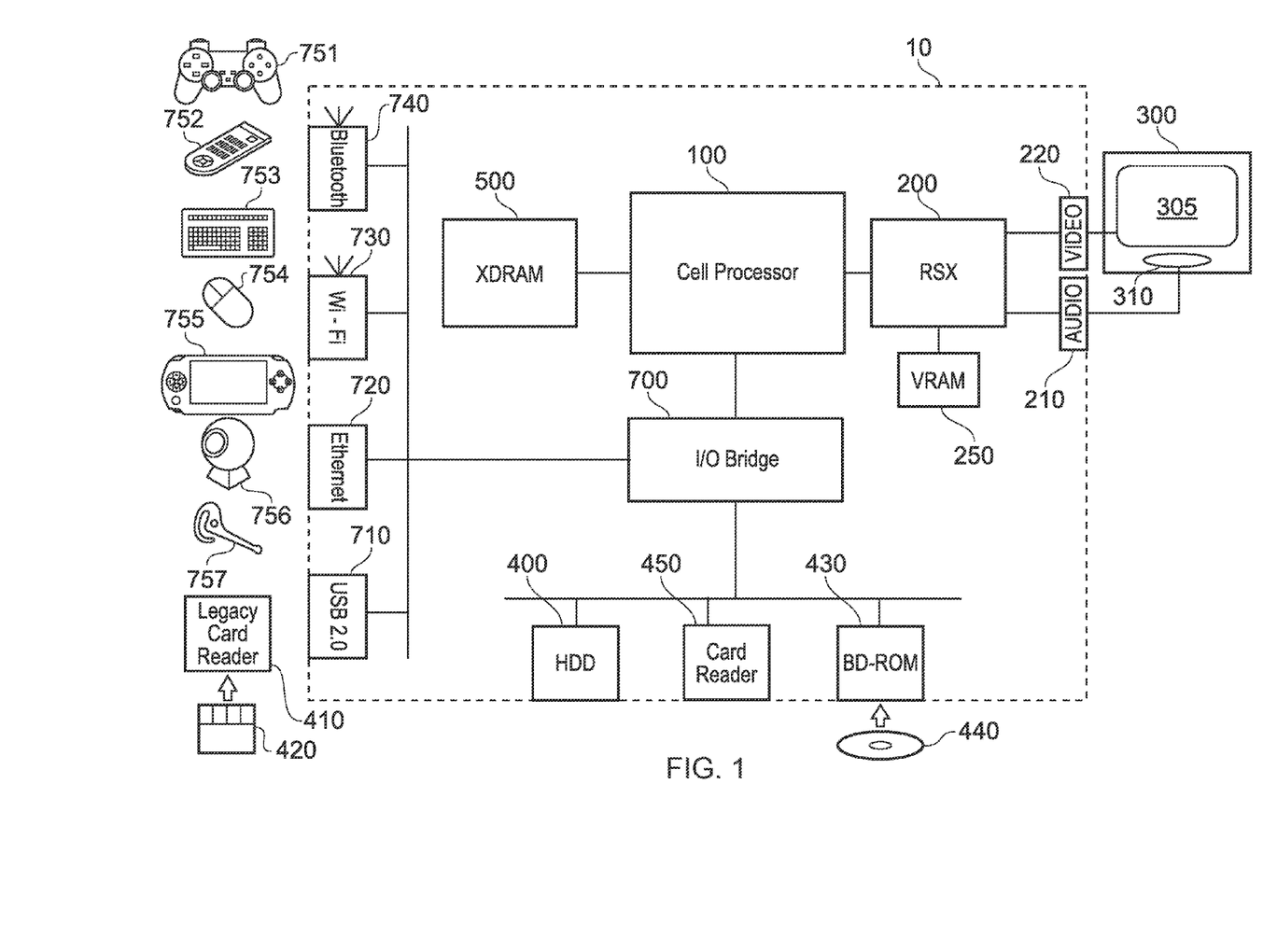
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
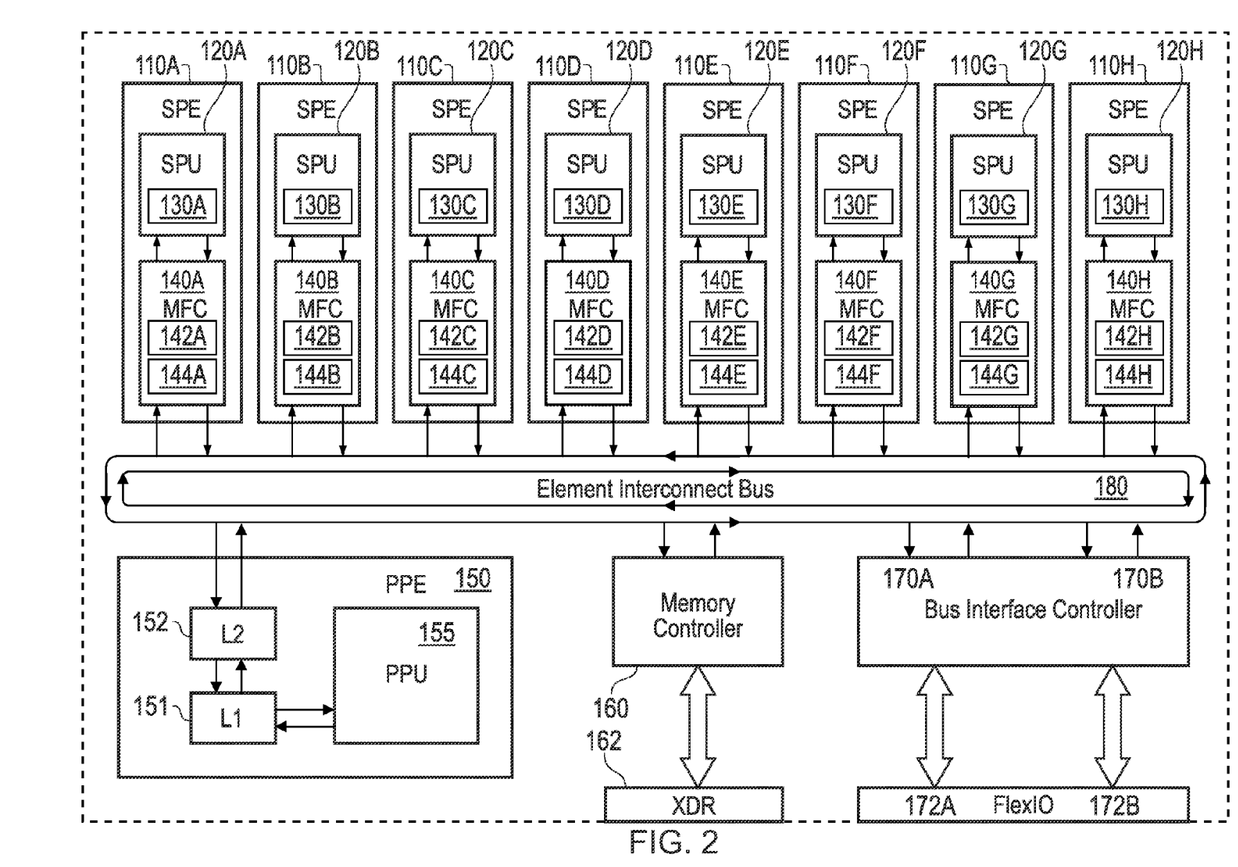
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
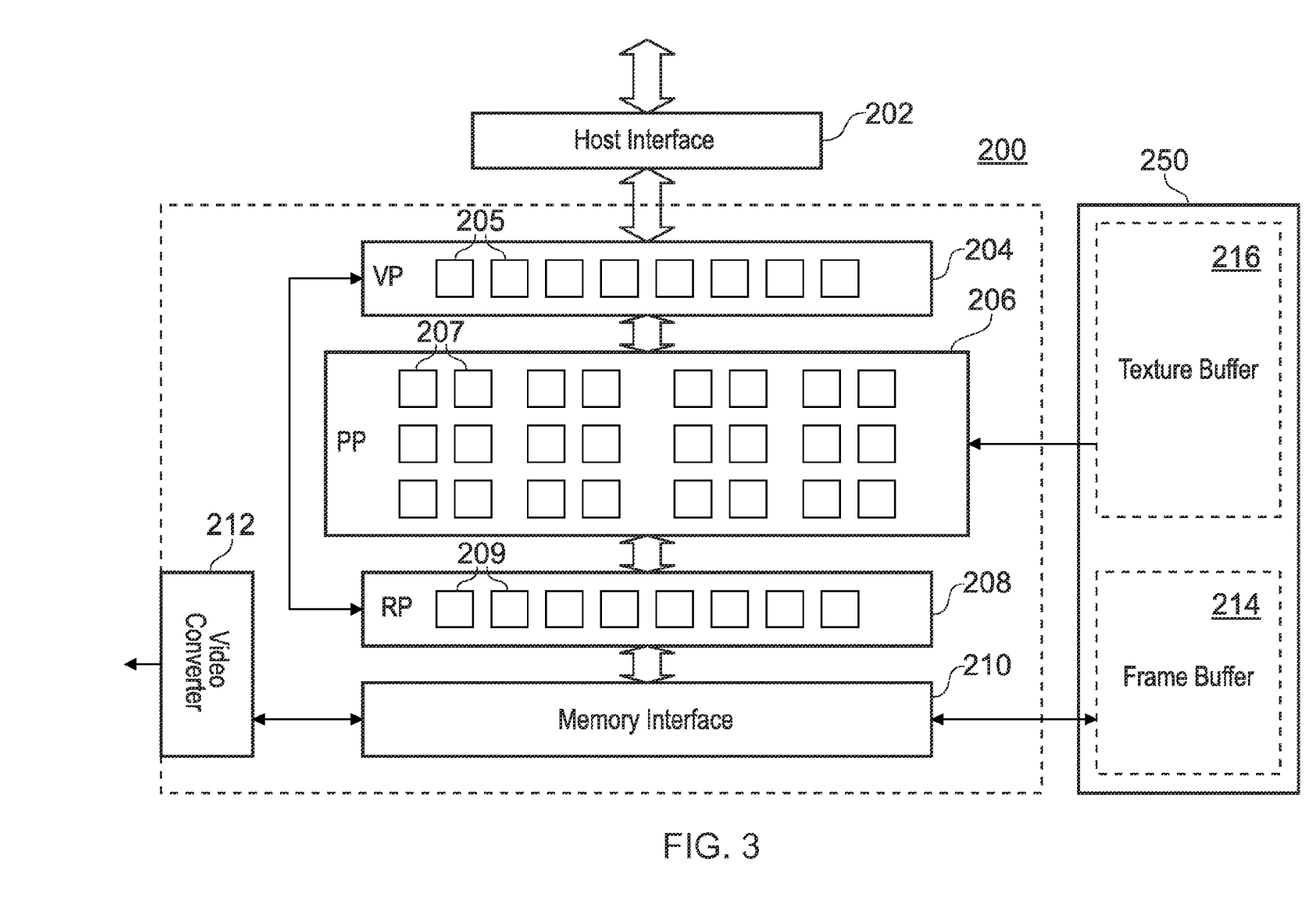
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion.

However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Embodiments of the present invention in which vector data is generated from an image drawn by a user will now be described with reference to FIGS. 4 to 13.

Figure 4:
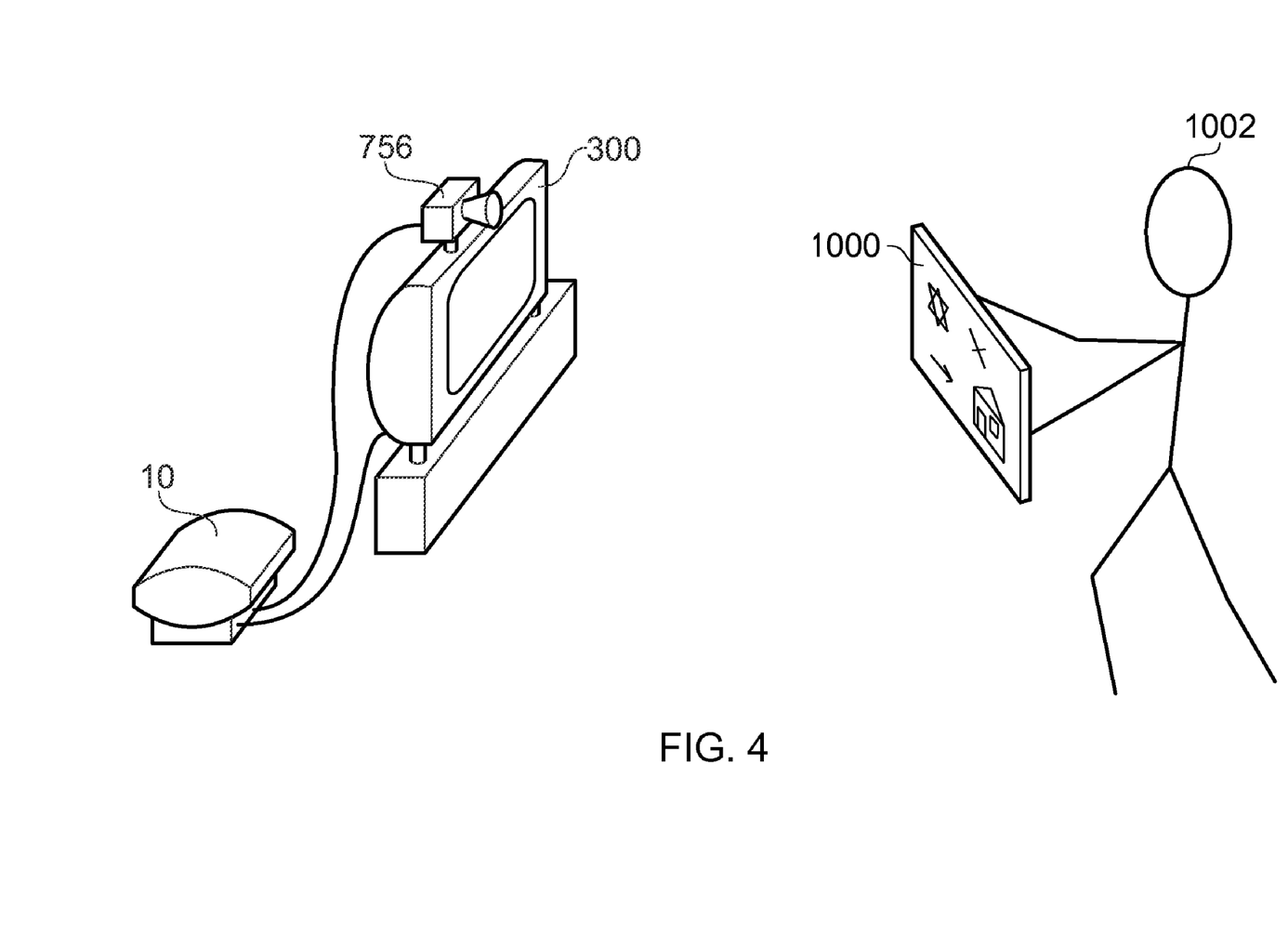
FIG. 4 is a schematic diagram of an entertainment system arranged to capture an image comprising a user drawn image using a camera in accordance with an embodiment of the present invention.

FIG. 4 is a schematic drawing of an entertainment system arranged to capture an image comprising a user drawn image using a camera in accordance with embodiments of the present invention.

In particular, FIG. 4 shows the video camera 756 arranged to capture an image of a wipeable whiteboard 1000 comprising a drawing surface on which a user 1002 may draw a user drawn image. The camera 756 is operable to transmit a camera captured image comprising the user drawn image to the system unit 10 so that the system unit 10 can cause the camera-captured image to be displayed on the display and sound output device 300.

For example, a user is able to input a blueprint for an object that can occupy the augmented reality environment and can interact with a virtual pet and/or other objects in an augmented reality environment. In this example, the user takes the wipeable whiteboard 1000, and draws an object upon it. However, it will be appreciated that the user may draw on a surface such as paper, card, slate, and the like, although any suitable drawing surface could be used. The user then notifies the entertainment device 10 that they have such a drawing, for example by selecting a menu item or pressing an assigned key on the controller.

At this point the entertainment device 10 outputs a video image to the display 300 that indicates the desired scale and orientation of the drawing for presentation to the video camera 756, for example by overlaying a frame of a certain size and orientation in front of the captured video feed from the camera 756.

The user positions the drawing so as to occupy this frame, and a capture of the user drawn image is taken. The captured drawing is analysed as described below so as to generate vector data associated with the user drawn image. This allows the entertainment device to render an image within the augmented reality environment which substantially corresponds to the user drawn image.

A possible way in which vector data may be generated from the user drawn image will now be described with reference to FIG. 5.

Figure 5:
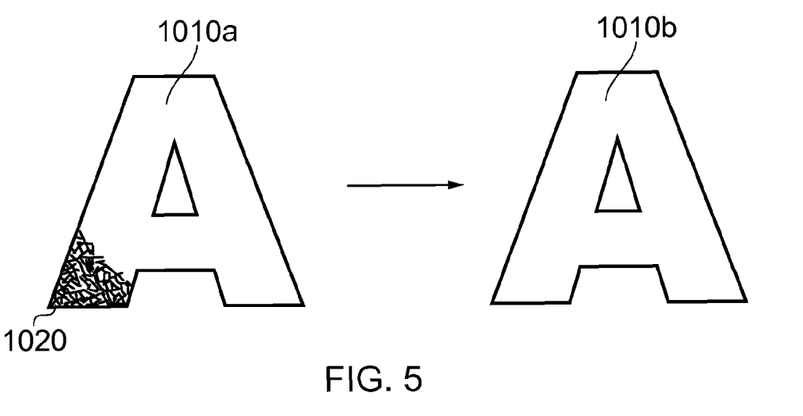
FIG. 5 is a schematic diagram of an example of vector generation from a user drawn image.
Figure 6:
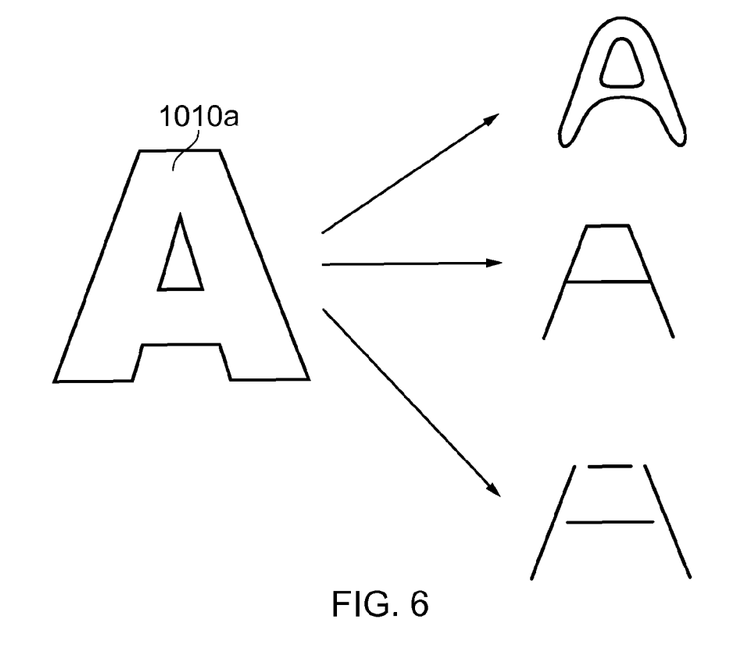
FIG. 6 is a schematic diagram of an example of rendering operations applied to vector data generated from a user drawn image.

FIG. 5 is a schematic diagram of an example of vector generation from a user drawn image. In particular, FIG. 5 shows an image feature 1010a from which vector data may be generated so that the image feature 1010a can later be rendered as an image feature 1010*b*. In some examples, the cell processor 100 is operable to generate vector data from the image feature 1010*a* by detecting the edges of the image feature 1010*a* using known techniques such as Canny edge detection.

The cell processor 100 is then operable to generate vector data using known techniques by detecting connected pixels within the image feature 1010*a* and generating a plurality of vectors so as to fill in the outline of the image feature 1010*a*. An example of generated vectors 1020 is shown in the bottom left hand corner of the image feature 1010*a*, where each line represents a vector. Although, only some vectors are shown, it will be appreciated that the vectors substantially fill the outline of the image feature 1010*a* thus allowing the image feature 1010*b* to be rendering at a later time using the generated vectors.

However, there are some drawbacks and disadvantages associated with this technique.

Firstly, the amount of vector data generated can be large, especially if the image feature from which the vectors are generated is complex in appearance (e.g. outline, colour etc.). Additionally, if the original image feature was stored as a bitmap, the resultant vector data which represents that bitmap can, in some cases, have a larger file size than the original bitmap. Therefore, using this method to generate vectors from a captured image feature can lead to an inefficient use of memory.

Secondly, as the vectors generated from the image feature 1010*a* substantially fill the image feature 1010*a* to the edge of the image feature 1010*a*, it may be difficult to carry out other image processing operations on the vectors representing the image feature 1010*a* so as to alter the appearance from that illustrated as image feature 1010*b* in FIG. 5. For example, as shown schematically in FIG. 6, it may be desirable to carry out other image processing operations so as to alter the appearance of the image feature 1010*a* when reproducing the image feature in a game or art package.

To address these problems, embodiments of the present invention thin the image feature to a line width which is smaller than a line width associated with the image feature so as to generate a modified width image feature. The cell processor 100 is then operable to generate the vector data from pixels associated with the modified width image feature so that the vector data substantially represents the modified width image feature.

The way in which this functionality is achieved in accordance with embodiments will now be described with reference to FIGS. 7 to 10.

Figure 7:
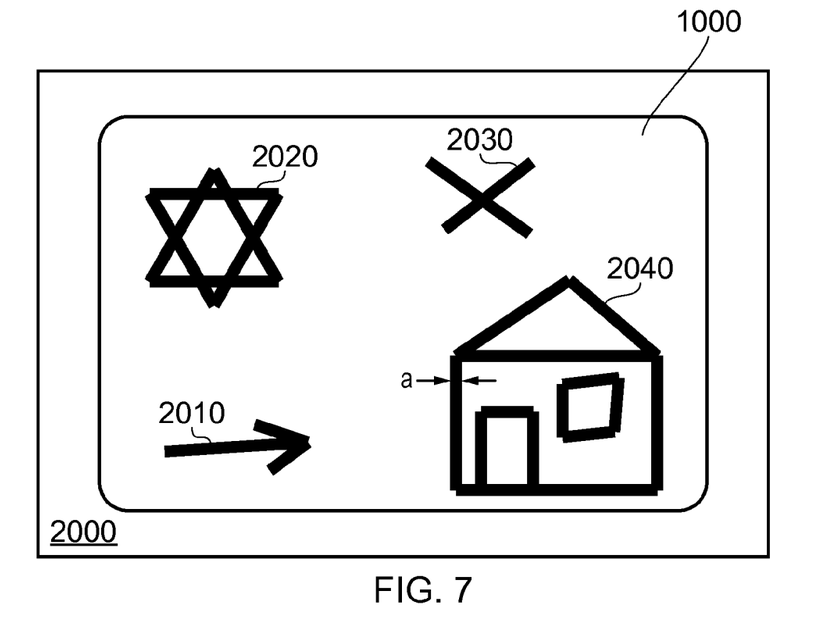
FIG. 7 is a schematic diagram of a camera captured image comprising user drawn images in accordance with embodiments of the present invention.

FIG. 7 is a schematic diagram of a camera captured image comprising user drawn images in accordance with embodiments of the present invention. In particular, FIG. 7 shows a camera captured image 2000 comprising a plurality of user drawn images (corresponding to an arrow 2010, a star 2020, a cross 2030, and a house 2040) which a user has drawn on the whiteboard 1000. The cell processor 100 is operable to apply an image processing operation to the camera captured images so as to generate an image feature which corresponds to a user drawn image.

In embodiments, the cell processor 100 is operable to apply an image threshold operation to the camera captured image so as to generate a binary image using known techniques. In embodiments, the binary image is a black and white image, although any other binary image could be used. In some embodiments, to generate the binary image, the cell processor 100 is operable to detect which pixels of the camera captured image 2000 have respective pixel values greater than an image threshold value. Those pixels whose respective pixel values are greater than the image threshold value are designated by the cell processor 100 as image feature pixels corresponding to an image feature. The image threshold value may be preset within software, or set by a user in accordance with ambient lighting conditions via a suitable user interface such as the cross media bar. However, any suitable image threshold value may be used.

Additionally, it will be appreciated that any suitable method of generating the binary image could be used. In some embodiments, the cell processor 100 is operable to apply a blur filter to the captured image using known techniques to reduce image noise, image shadings and image artefacts. The binary image can then be generated from the filtered image. Therefore, changes in colour or gradients across the whiteboard 1000 (for example due to lighting conditions on the whiteboard 1000) are less likely to affect the quality of the binary image.

In some embodiments, the cell processor 100 is operable to detect which of the image feature pixels are contiguous with each other using known techniques. Those image feature pixels which are contiguous with each other are designated by the cell processor 100 as belonging to the same image feature. However, any other suitable technique for detecting different image features may be used. In this way several different image features may be distinguished from each other. Accordingly, each image feature can be processed separately, and in parallel on respective SPEs, to other image features, thus speeding up processing.

Additionally, in some embodiments, only image features within a predefined window in the camera captured image may be analysed. This reduces processing resources because not all the image needs to be analysed. Additionally, other image features which may be unwanted or not relevant, such as the perimeter of the whiteboard 1000, do not need to be processed and therefore the use of a predefined window excludes these features before processing.

Once the image features have been generated from the camera captured image 2000, the cell processor is operable to thin each image feature to a line width which is smaller than a line width associated with that image feature so as to generate one or more modified width image features. This is illustrated with respect to FIG. 8.

Figure 8:
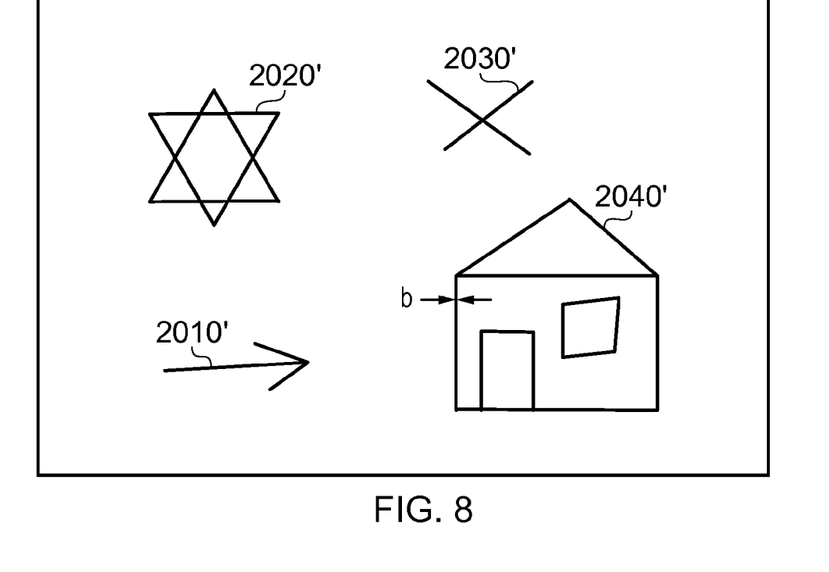
FIG. 8 is a schematic diagram of a camera captured image to which image processing and thinning has been applied in accordance with embodiments of the present invention.

FIG. 8 shows a schematic diagram of a camera captured image to which image processing and thinning has been applied in accordance with embodiments of the present invention. In particular, FIG. 8 shows modified width image feature 2010' (corresponding to the arrow 2010), modified width image feature 2020' (corresponding to the star 2020), modified width image feature 2030' (corresponding to the cross 2030), and modified width image feature 2040' (corresponding to the house 2040).

In embodiments, the cell processor 100 is operable to thin (skeletonise) each image feature to a line width which is smaller than a line width associated with the respective image feature by carrying out a skeletonisation operation on each generated image feature such as the arrow 2010 or the house 2040. Skeletonisation is a technique known in the art and so will not be described in detail herein.

For example, the cell processor is operable to thin a line width a of the image feature corresponding to house 2040 to a line width b of the modified width image feature 2040', where b is less than a (b<a). In some embodiments, once skeletonisation of an image feature has been carried out, the line width of the respective modified width image feature is one pixel wide. This facilitates generating the vector data more quickly because fewer pixels have to be analysed to generate the vector data. However, it will be appreciated that any suitable line width for the modified width image feature may be used.

Once an image feature has been skeletonised so as to generate a modified width image feature, the cell processor 100 is operable to generate vector data from pixels associated with the modified width image feature so that the vector data substantially represents the modified width image feature. In embodiments, the vector data comprises a plurality of vectors, each having an associated magnitude and direction. However, it will be appreciated that any other suitable type of vector data may be used, such as vector data relating to spline curves and the like.

The way in which vector data is generated in accordance with embodiments of the present invention will now be described with reference to FIG. 9.

Figure 9:
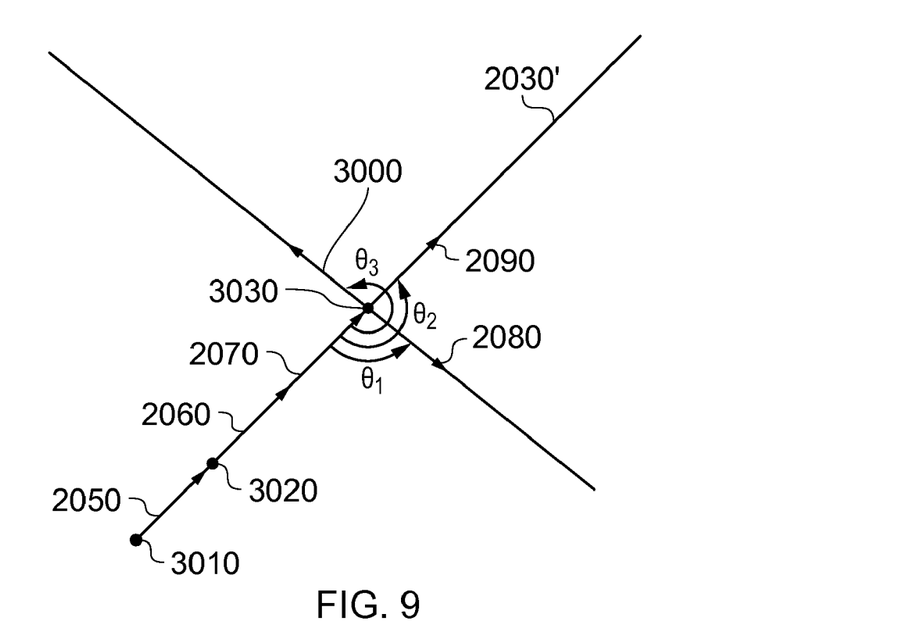
FIG. 9 is a schematic diagram of a modified width image feature from which vector data is to be generated in accordance with embodiments of the present invention.

FIG. 9 shows a schematic diagram of a modified width image feature from which vector data is to be generated in accordance with embodiments of the present invention. In particular, FIG. 9 shows the modified width image feature 2030' (corresponding to the cross 2030). FIG. 9 also shows vectors 2050, 2060, 2070, 2080, 2090, and 3000. For the sake of clarity in understanding the drawing, not all the vectors representing the modified width image feature 2030' are shown in FIG. 9. An angle in the anti-clockwise direction between vector 2070 and vector 2080 is illustrated as $\theta_1$. An angle in the anti-clockwise direction between vector 2070 and vector 2090 is illustrated as $\theta_2$. An angle in the anti-clockwise direction between vector 2070 and vector 3000 is illustrated as $\theta_3$.

To generate the vector data, the cell processor is operable to scan, on a pixel-by-pixel basis, the pixels of the modified width image feature 2030' using known techniques to detect pixels which are adjacent and connected to each other. In this case, connected is taken to mean any adjacent pixel in any of a horizontal, vertical, or diagonal direction with respect to a pixel of the modified width image feature.

For example, starting at a point 3010 on the modified width image feature 2030' in FIG. 9, the cell processor 100 is operable to scan pixels surrounding the point 3010 to detect adjacent and connected pixels. Then, starting from a detected adjacent and connected pixel, the process is repeated to find the next adjacent and connected pixel.

Once a predetermined number of adjacent and connected pixels have been detected, the cell processor 100 is operable to generate a vector corresponding to start and end pixels corresponding to the predetermined number of connected pixels. In embodiments of the present invention, the predetermined number of pixels is four, although it will be appreciated that any suitable value could be used. Additionally, the predetermined number of pixels can be altered within software depending on processing resources available, resolution required, and other suitable criteria.

For example, referring to FIG. 9, a start pixel corresponds to the point 3010 on the modified width image feature 2030', and an end pixel corresponds to a point 3020 on the modified width image feature 2030'. Therefore, the cell processor 100 is operable to generate the vector 2050 so as to correspond to a line joining the point 2010 and the point 3020, thus substantially representing a portion of the modified width image feature 2030' between the points 3010 and 3020.

The cell processor 100 is operable to carry out this process with respect to each pixel start and end point so as to generate vectors such as vectors 2060 and 2070. If, during processing, the cell processing detects that there is more than one adjacent and connected pixel (such as at a point 3030 in FIG. 9), then the cell processor 100 is operable to mark that pixel as corresponding to a vector junction. In other words, where there is more than one adjacent and connected pixel with respect to a current pixel in the vector generation process, there is more than one possible path. Therefore, the cell processor 100 is operable to detect adjacent and connected pixels in respect of each path so as to generate vectors accordingly.

In the example shown in FIG. 9, there are three possible paths from the point 3030, corresponding to vectors 2080, 2090 and 3000 respectively. The cell processor 100 is therefore operable to generate the vectors 2080, 2090 and 3000 accordingly, and generate further vectors from the end points of each of the vectors 2080, 2090, and 3000.

The process of vector generation continues until all the pixels of the modified width image feature have been scanned and vectors generated accordingly so that the vector data substantially represents the modified width image feature.

In some embodiments, each of the vectors has substantially the same or the same magnitude as each of the other vectors. This facilitates interpolation between image frames as each of the vectors has substantially the same magnitude (length) and therefore the start and end points of each vector are likely to be similar between successive image frames.

Once the vectors have been generated by the cell processor 100, the cell processor 100 is operable to analyse the generated vectors so as to detect vector object attributes such as lines and shapes.

In an embodiment, so as to detect lines of consecutive vectors, the cell processor 100 is operable to detect a relative angle between the direction of a first vector and the direction of a second vector consecutive to the first vector. Here, consecutive is taken to mean a vector whose start or end point corresponds with the start or end point of another vector. For example, referring to FIG. 9, vector 2050 is consecutive with vector 2060 because the end point of vector 2050 corresponds with the start point of the vector 2060 at the point 3020.

If the cell processor detects that the relative angle between the direction of the first vector and the direction of the second vector is within a threshold angle range with respect to the first vector, then the cell processor 100 is operable to associate the first vector and the second vector so as to generate vector association data indicative of the association between the first vector and the second vector. In embodiments, the threshold angle range is between 175 degrees (175°) and 185 degrees (185°), although it will be appreciated that any other suitable threshold angle range could be used. In other words, in some embodiments, the threshold angle range is defined as $175° \leq \theta \leq 185°$. Therefore, consecutive vectors which lie on substantially the same straight line will be associated with each other. It will be appreciated that the threshold angle range and the angles between the vectors could be defined in any other suitable manner such as in radians, and that other reference points or vectors could be used.

In some embodiments, the vector data comprises the vector association data, and the vector association data comprises one or more sets of associated vectors. In some embodiments, each set of associated vectors represents a different line corresponding to a respective line of the modified width image feature. This advantageously allows each line to be treated separately when rendering the vector data, for example to emulate brush strokes or brush direction. Additionally, by applying different rendering operations as appropriate to different parts of the modified width image feature when it is rendered, an image can be rendered which corresponds to a user drawn image but illustrated as if the user drawn image was drawn by a child.

An example of the association between vectors will now be described with reference to FIG. 9. As mentioned above, $\theta_1$ is the angle in the anti-clockwise direction between the vector 2070 and the vector 2080, $\theta_2$ is the angle in the anti-clockwise direction between the vector 2070 and the vector 2090, and $\theta_3$ is the angle in the anti-clockwise direction between the vector 2070 and the vector 3000. In this example, $\theta_1=95°$, $\theta_2=180°$, and $\theta_3=275°$. Therefore, when generating the vector association data, the cell processor is operable to associate the vector 2090 with the vector 2070 because the respective angle between vector 2070 and vector 2090 ($\theta_2=180°$) lies within the threshold value range, thus indicating the two vectors lie on the same line of the modified width image feature 2030'.

However, the vector 2080 and the vector 3000 will not be associated with the vector 2070 because their respective angles with the vector 2070 ($\theta_1=95°$, and $\theta_3=275°$) lie outside the threshold angle range thus indicating they are not in the same direction as the vector 2070 and therefore unlikely to correspond to the same line of the modified width image feature 2030'.

It will be appreciated that other suitable object detection and shape recognition techniques could be used to generate the vector association data. Additionally, other relationships between vectors could be detected so as to generate the vector association data as appropriate.

The above described method of generating vector data has a number of advantages over the method described with respect to FIG. 5.

Firstly, the size of the vector data can be substantially smaller than that required to represent the whole user drawn image because the vector data is generated from the skeletonised user drawn image, which has fewer vectors than if the vectors were randomly distributed within the outline of the user drawn image as described above with reference to FIG. 5.

Secondly, because fewer pixels need to be scanned and analysed in order to generate the vector data, processing resources can be reduced, thus allowing the vector data to be generated substantially in real time; the vector data generated in accordance with the embodiments described herein is based on a skeletonised image rather than the whole user drawn image. Additionally, the skeletonised image is thinner than a line width of the image feature corresponding to the user drawn image and therefore there are fewer pixels to analyse.

Thirdly, many different image rendering operations may be carried out when rendering the modified width image feature so as to correspond to the user drawn image. For example, image rendering operations such as skew, distortion, rotation, enlarge, shrink and the like may be carried out because the vector data represents the skeletonised shape rather than randomised vectors which fill in the outline of the user drawn image. As another example, lettering drawn by a user could be drawn within a game as balloons, lightning or any other shape according to input by the user of a setting within software.

A method of generating vector data from a camera captured image comprising a user drawn image will now be described with reference to FIG. 10.

Figure 10:
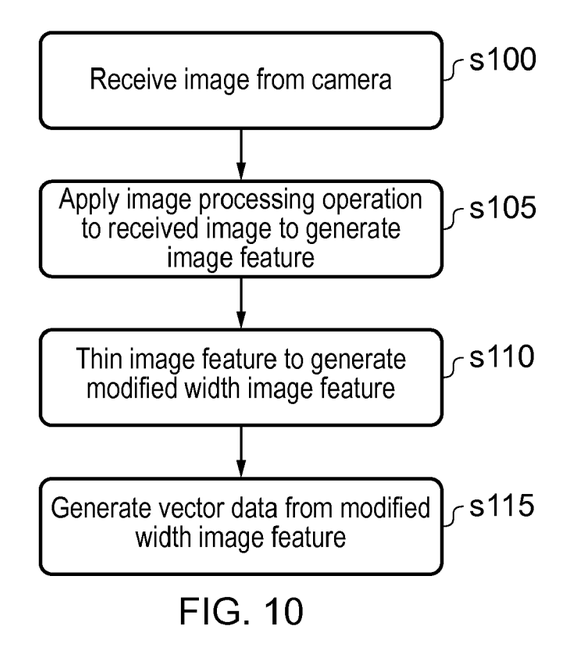
FIG. 10 is a flowchart of a method of generating vector data in accordance with embodiments of the present invention.

FIG. 10 is a flowchart of a method of generating vector data in accordance with embodiments of the present invention.

At a step s100, the cell processor 100 receives a camera captured image from the camera 756. As mentioned above, a user may hold at least part of a user drawn image within the field of view of the camera 756 so that the camera captured image comprises the user drawn image.

Then, at a step s105, the cell processor 100 applies image processing to the camera captured image so as to generate an image feature which corresponds to the user drawn image. The image processing operation may comprise an image threshold operation as mentioned above. In other embodiments, which will be described in more detail below, the image processing operation comprises a flood fill operation together with detection of boundary pixels. Alternatively, these image processing operations may be combined.

At a step s110, the cell processor 100 thins (skeletonises) the generated image feature to a line width which is smaller than a line width associated with the image feature so as to generate a modified width image feature as described above.

Then, at a step s115, the cell processor generates vector data as described above from pixels associated with the modified width image feature so that the vector data substantially represents the modified width image feature. The vector data can then be used to reproduce the user drawn image whilst allowing different rendering operations to be performed on the vector data.

As an example of the use of the vector data, a user drawn image such as that of a car may be used to transform a two-dimensional drawing by a user into a virtual three-dimensional object. For example, a three dimensional virtual model of the drawing in the captured image can be generated using a set of rules specific to an archetypal model with which the drawing is associated.

To do this, the cell processor can generate vector data from a user drawn image as described above. A set of transformational rules specific to the archetypal object are then applied by the cell processor 100 to the vector data. In the case of the car, the main body is extruded into the third dimension, for example by an extent proportional to the length of the drawn object. Meanwhile, the front and rear wheels (front and rear may be determined by a simple left/right convention, for example, or according to the archetype) are offset in the third dimension with respect to the main body and extruded to a much smaller degree. In addition, a second pair of wheels is generated by copying the front and rear wheels, and are offset in the third dimension to the far side of the car. In this way, a two-dimensional physical drawing can be used as the template for building a three dimensional virtual object, with different elements of the drawing undergoing different extrusions, duplications or other transformations in 3D according to their identified role with respect to the associated archetypal object. Generation of a three-dimensional model from a two-dimensional drawing is described in European Patent Application Number 08252735.9, the entire contents of which is hereby incorporated herein by reference.

However, if a user makes a mistake when drawing or is not a very accomplished artist, then they may draw an object, such as a circle corresponding to wheel, without accurately representing the object. Therefore, the cell processor 100 may be unable to recognise an archetypal object and therefore may not be able to generate the appropriate three-dimensional virtual model.

The way in which embodiments of the present invention address this problem will now be described with reference to FIGS. 11 to 13.

Figure 11:
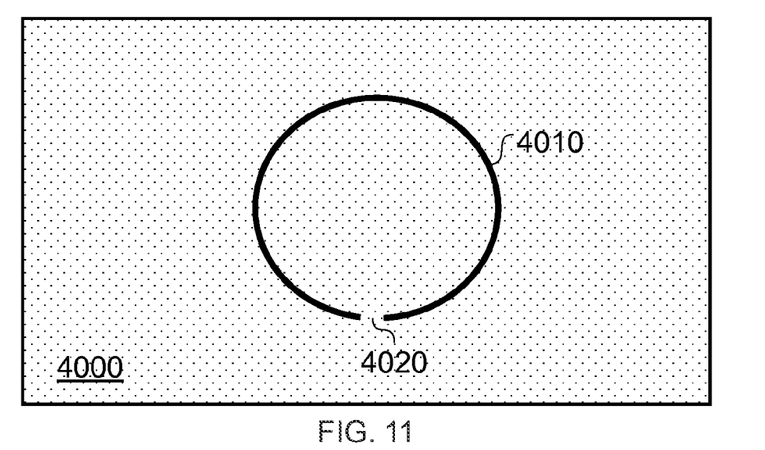
FIG. 11 is a schematic diagram of a camera captured image comprising a user drawn image in accordance with embodiments of the present invention.

FIG. 11 is a schematic diagram of a camera captured image comprising a user drawn image in accordance with embodiments of the present invention. In particular, FIG. 11 shows a camera captured image 4000 comprising a user drawn image 4010. As is shown in FIG. 11, the user drawn image 4010 substantially corresponds to a broken circle. However, the user drawn image 4010 is not a continuous circle and has a gap 4020 where the circle is incomplete. For example, if the user drawn image 4010 was intended by the user to correspond to the wheel of a car, the cell processor 100 may have difficulty in detecting the user drawn image as corresponding to a wheel because the user drawn image 4010 is not a continuous circle.

Therefore, in order to bridge the gap 4020 so that the cell processor can generate vector data from the user drawn image and use the generated vector data to generate a virtual wheel, in embodiments, the cell processor 100 is operable to carry out a flood fill operation on the camera captured image 4000 (as indicated by the dotted shading in FIG. 11). Flood fill operations are known in the art and so will not be described in detail herein.

In some embodiments, the cell processor 100 is operable to apply an image threshold operation as described above to the camera captured image before or after the flood fill operation is carried out. However, in other embodiments, the image threshold operation need not be carried out.

The cell processor 100 is operable to detect boundary pixels associated with a boundary between a first image region corresponding to the user drawn image 4010 and a second image region corresponding to a flood filled image area, such as that corresponding to the dotted shaded region in FIG. 11 using known techniques such as edge detection. The boundary pixels are schematically illustrated in FIG. 12 which is a schematic diagram of a boundary between a flood filled image region and a user drawn image in accordance with embodiments of the present invention.

Figure 12:
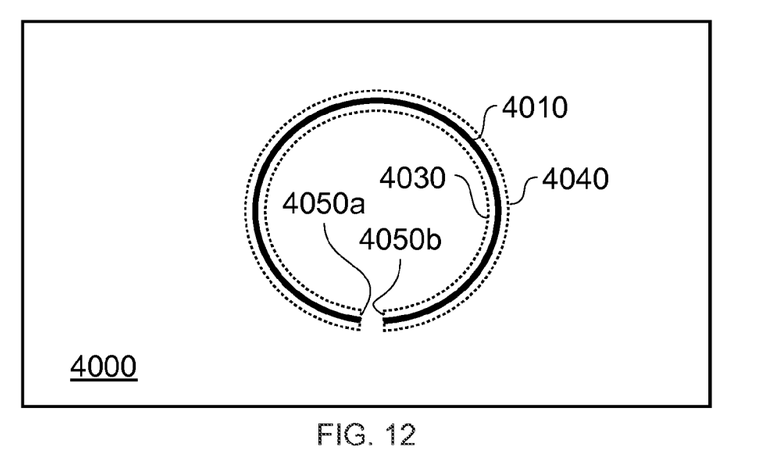
FIG. 12 is a schematic diagram of a boundary between a flood filled image region and a user drawn image.

FIG. 12 shows an inner boundary 4030, an outer boundary 4040, and gap boundaries 4050*a* and 4050*b*. Although the boundaries in FIG. 12 are shown as not being adjacent to the image region corresponding to the user drawn image 4010, it should be understood that this is for the purposes in understanding the drawing and that the boundaries would be situated so that they were in contact with the image region corresponding to the user drawn image 4010. Pixels lying on the boundaries between the flood filled image region and the image region corresponding to the user drawn image 4010 are designated as boundary pixels.

In some embodiments, the cell processor 100 is operable to mask pixels of the camera captured image which do not correspond to boundary pixels. To achieve this functionality, those pixels which are detected as not corresponding to boundary pixels are flagged by the cell processor 100 so that the non-boundary pixels can be ignored during later processing. This reduces processing resources needed for further image processing on the boundary pixels as described below with reference to FIG. 13 because the flagged non-boundary pixels need not be processed.

Once the cell processor has detected the boundary pixels, the cell processor 100 is operable to associate, for each boundary pixel, a predetermined number of pixels surrounding the boundary pixel with that boundary pixel. This is illustrated in FIG. 13.

Figure 13:
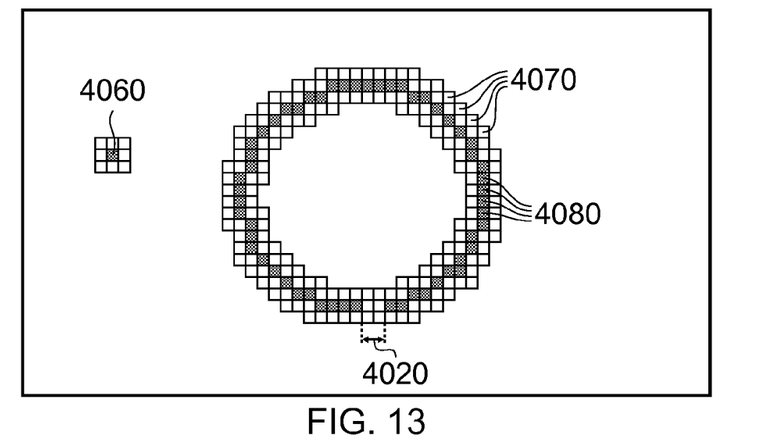
FIG. 13 is a schematic diagram of the association of pixels with detected boundary pixels.

FIG. 13 is a schematic diagram of the association of pixels with detected boundary pixels in accordance with embodiments of the present invention. In the embodiment schematically illustrated in FIG. 13, pixels such as pixels 4070 are represented by squares and boundary pixels corresponding to the inner boundary 4030, such as boundary pixels 4080, are represented by squares shaded with dots. Additionally, in the embodiment shown in FIG. 13, 8 surrounding pixels are associated with each boundary pixel, although any other number of pixels could be associated with each boundary pixel. To illustrate this, a boundary pixel 4060 is shown surrounded by eight other pixels. Each boundary pixel is associated with surrounding pixels so that together the boundary pixels and the pixels associated with the boundary pixels form the image feature. Therefore, the gap 4020 can be filled, thus forming a continuous circle. In other words, the process described with reference to FIG. 13 can be thought of as being analogous to drawing with a thick brush at every point in the image corresponding to a boundary pixel. Here, a thick brush should be taken to mean a brush having a diameter greater than a diameter associated with a boundary pixel.

The cell processor 100 is then operable to skeletonise the generated image feature and generate the vector data as described above. Therefore, even though the user drawn image was not a closed shape, by applying the above described method, the cell processor 100 can associate pixels with gaps in the user drawn shape and thus enable an archetype to be recognised correctly.

It will be appreciated that, whilst the process described above with reference to FIG. 13 can allow an archetype to be recognised correctly, some details of the user drawn user may be reduced due to the association of other pixels with the boundary pixels (i.e. a thickening operation). Therefore, when a three-dimensional model generated from the user drawn image is displayed to a user, the user may be disappointed that some detail may have been lost and therefore the 3D object may not appear to them as they may desire.

To address this, in some embodiments, the cell processor 100 is operable to generate vector data as described above from the inner boundary of an object following the flood fill operation. For example, referring to FIG. 13, the cell processor 100 is operable to generate vector data from the inner boundary 4030. In other embodiments, vector data could also be generated from an outer boundary (such as outer boundary 4040) as well as, or instead of, from the inner boundary.

As mentioned above, in some embodiments, the cell processor 100 is operable to use the vector data generated from the thickening process described above with reference to FIG. 13 to generate a suitable three-dimensional object according to an archetype of an object. However, to improve the appearance of the three-dimensional object to a user, the cell processor 100 is operable to render an outline of the user drawn image on the three-dimensional object based on the vector data generated from the inner and/or outer boundary. The detail of the user drawn image is likely to be more accurately represented by the vector data generated from a boundary and therefore, when rendered on the three dimensional object a user is more likely to be satisfied that their drawing has been correctly reproduced in three dimensions. In other words, the vector data generated from a boundary can be rendered so that it appears as if stamped on the 3D object.

It will be appreciated that the above described techniques may be combined as appropriate. For example, the skeletonisation technique described above with reference to FIGS. 7 to 10 may be applied to the some or all of the image feature generated by associating pixels with boundary pixels as described above with reference to FIG. 11.

Additionally, it will be appreciated that any suitable camera may be used to capture the camera captured images, such as a camera operable to capture two-dimensional images, a camera operable to capture two-dimensional images together with depth data indicative of a distance between the camera and objects in the field of view of the camera, and the like. In embodiments, the camera may be a video camera, a web camera, and the like.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

In conclusion, although a variety of embodiments have been described herein, these are provided by way of example only, and many variations and modifications on such embodiments will be apparent to the skilled person and fall within the scope of the present invention, which is defined by the appended claims and their equivalents.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. An image processing method comprising:
receiving, from a camera, a camera captured image comprising a user drawn image, at least part of the user drawn image being within a field of view of the camera;
applying an image processing operation to the camera captured image so as to generate an image feature within the camera captured image which corresponds to the user drawn image;
thinning the image feature to a line width which is smaller than a line width associated with the image feature so as to generate a modified width image feature; and
generating vector data from pixels associated with the modified width image feature so that the vector data substantially represents the modified width image feature;
wherein the image processing operation comprises:
carrying out a flood fill operation on the camera captured image so as to detect boundary pixels associated with a boundary between a first image region corresponding to the user drawn image and a second image region corresponding to a flood filled image area; and
for each boundary pixel, associating a predetermined number of pixels surrounding the boundary pixel with that boundary pixel,
in which the image feature comprises the boundary pixels together with the pixels associated with those boundary pixels.

2. A method according to claim 1, in which:
the image processing operation further comprises applying an image threshold operation to the camera captured image so as to generate a binary image; and
the image threshold operation comprises detecting pixels of the camera captured image whose respective pixel values are greater than an image threshold value,
in which the image feature corresponds to those pixels whose respective pixel values are greater than the image threshold value.

3. A method according to claim 1, in which the flood fill operation comprises masking pixels of the camera captured image which do not correspond to boundary pixels.

4. An image processing method, comprising:
receiving, from a camera, a camera captured image comprising a user drawn image, at least part of the user drawn image being within a field of view of the camera;
applying an image processing operation to the camera captured image so as to generate an image feature within the camera captured image which corresponds to the user drawn image;
thinning the image feature to a line width which is smaller than a line width associated with the image feature so as to generate a modified width image feature; and
generating vector data from pixels associated with the modified width image feature so that the vector data substantially represents the modified width image feature;
in which:
the vector data comprises a plurality of vectors, each having an associated magnitude and direction, and each of the vectors has substantially the same magnitude.

5. A method according to claim 4, in which generating the vector data comprises:
detecting a relative angle between the direction of a first vector and the direction of a second vector consecutive with the first vector; and
associating the first vector with the second vector if the relative angle between the direction of the first vector and the direction of the second vector is within a threshold angle range with respect to the first vector.

6. A method according to claim 4, in which generating the vector data comprises:
detecting a relative angle between the direction of a first vector and the direction of a second vector consecutive with the first vector; and
associating the first vector with the second vector if the relative angle between the direction of the first vector and the direction of the second vector is within a threshold angle range with respect to the first vector.

7. A method according to claim 1, in which the line width of the modified width image feature is one pixel wide.

8. A tangible, non-transitory computer readable medium on which is stored instructions of a computer program, the instructions, when executed by a processor of a computer, cause the computer to perform an image processing method comprising:
receiving, from a camera, a camera captured image comprising a user drawn image, at least part of the user drawn image being within a field of view of the camera;
applying an image processing operation to the camera captured image so as to generate an image feature within the camera captured image which corresponds to the user drawn image;
thinning the image feature to a line width which is smaller than a line width associated with the image feature so as to generate a modified width image feature; and
generating vector data from pixels associated with the modified width image feature so that the vector data substantially represents the modified width image feature;
wherein the image processing operation comprises:
carrying out a flood fill operation on the camera captured image so as to detect boundary pixels associated with a boundary between a first image region corresponding to the user drawn image and a second image region corresponding to a flood filled image area; and
for each boundary pixel, associating a predetermined number of pixels surrounding the boundary pixel with that boundary pixel,
in which the image feature comprises the boundary pixels together with the pixels associated with those boundary pixels.

9. Image processing apparatus comprising:
an image receiver to receive, from a camera, a camera captured image comprising a user drawn image, at least part of the user drawn image being within a field of view of the camera;
an image processor to apply an image processing operation to the camera captured image so as to generate an image feature within the camera captured image which corresponds to the user drawn image;
an image thinner to thin the image feature to a line width which is smaller than a line width associated with the image feature so as to generate a modified width image feature; and
a vector data generator to generate vector data from pixels associated with the modified width image feature so that the vector data substantially represents the modified width image feature;
wherein the image processing operation comprises:
carrying out a flood fill operation on the camera captured image so as to detect boundary pixels associated with a boundary between a first image region corresponding to the user drawn image and a second image region corresponding to a flood filled image area; and
for each boundary pixel, associating a predetermined number of pixels surrounding the boundary pixel with that boundary pixel,
in which the image feature comprises the boundary pixels together with the pixels associated with those boundary pixels.

10. An image processing system comprising:
an image processing apparatus; and
a camera operable to capture a camera captured image comprising a user drawn image, and to transmit the camera captured image to the image processing apparatus,
the image processing apparatus comprising:
an image receiver to receive, from the camera, the camera captured image comprising the user drawn image, at least part of the user drawn image being within a field of view of the camera;
an image processor to apply an image processing operation to the camera captured image so as to generate an image feature within the camera captured image which corresponds to the user drawn image;
an image thinner to thin the image feature to a line width which is smaller than a line width associated with the image feature so as to generate a modified width image feature; and
a vector data generator to generate vector data from pixels associated with the modified width image feature so that the vector data substantially represents the modified width image feature;
wherein the image processing operation comprises:
carrying out a flood fill operation on the camera captured image so as to detect boundary pixels associated with a boundary between a first image region corresponding to the user drawn image and a second image region corresponding to a flood filled image area; and
for each boundary pixel, associating a predetermined number of pixels surrounding the boundary pixel with that boundary pixel,
in which the image feature comprises the boundary pixels together with the pixels associated with those boundary pixels.

11. Image processing apparatus comprising:
receiving means operable to receive, from a camera, a camera captured image comprising a user drawn image, at least part of the user drawn image being within a field of view of the camera;
image processing means operable to apply an image processing operation to the camera captured image so as to generate an image feature within the camera captured image which corresponds to the user drawn image;
image thinning means operable to thin the image feature to a line width which is smaller than a line width associated with the image feature so as to generate a modified width image feature; and
vector data generating means operable to generate vector data from pixels associated with the modified width image feature so that the vector data substantially represents the modified width image feature;
wherein the image processing operation comprises:
carrying out a flood fill operation on the camera captured image so as to detect boundary pixels associated with a boundary between a first image region corresponding to the user drawn image and a second image region corresponding to a flood filled image area; and
for each boundary pixel, associating a predetermined number of pixels surrounding the boundary pixel with that boundary pixel,
in which the image feature comprises the boundary pixels together with the pixels associated with those boundary pixels.

12. An image processing system comprising:
an image processing apparatus; and
a camera operable to capture a camera captured image comprising a user drawn image, and to transmit the camera captured image to the image processing apparatus,
the image processing apparatus comprising:
receiving means operable to receive, from the camera, the camera captured image comprising the user drawn image, at least part of the user drawn image being within a field of view of the camera;
image processing means operable to apply an image processing operation to the camera captured image so as to generate an image feature within the camera captured image which corresponds to the user drawn image;
image thinning means operable to thin the image feature to a line width which is smaller than a line width associated with the image feature so as to generate a modified width image feature; and
vector data generating means operable to generate vector data from pixels associated with the modified width image feature so that the vector data substantially represents the modified width image feature;
wherein the vector data comprises a plurality of vectors, each having an associated magnitude and direction, and each of the vectors has substantially the same magnitude.

* * * * *